US006795549B2

(12) United States Patent
Ferianz et al.

(10) Patent No.: US 6,795,549 B2
(45) Date of Patent: Sep. 21, 2004

(54) DRIVE CIRCUIT

(75) Inventors: Thomas Ferianz, Glanegg (AT); Dietmar Straeussnigg, Villach (AT); Peter Singerl, Villach (AT); Herbert Zojer, Villach (AT)

(73) Assignee: Infineon Technologies AG, Munich (DE)

( * ) Notice: Subject to any disclaimer, the term of this patent is extended or adjusted under 35 U.S.C. 154(b) by 386 days.

(21) Appl. No.: 09/997,804

(22) Filed: Nov. 30, 2001

(65) Prior Publication Data

US 2002/0082826 A1 Jun. 27, 2002

(30) Foreign Application Priority Data

Nov. 30, 2000 (DE) ........................................ 100 59 465

(51) Int. Cl.[7] ................................................ H04M 1/00
(52) U.S. Cl. ............................... 379/399.03; 379/93.01
(58) Field of Search ........................... 379/93.01, 93.05, 379/93.06, 93.08, 390.01, 390.04, 399.01

(56) References Cited

U.S. PATENT DOCUMENTS 5,627,501 A * 5/1997 Biran et al. ............ 379/390.03
5,910,970 A * 6/1999 Lu .......................... 379/93.01
6,295,343 B1 * 9/2001 Hjartarson et al. ...... 379/93.05

FOREIGN PATENT DOCUMENTS

EP 0 942 578 A2 9/1999 .......... H04M/11/06

* cited by examiner

*Primary Examiner*—Minsun Oh Harvey
*Assistant Examiner*—Jefferey Harold
(74) *Attorney, Agent, or Firm*—Withrow & Terranova, PLLC

(57) ABSTRACT

Driver circuit for driving voice and data signals from a switching center via a subscriber line (38) to a subscriber terminal, having:

a controllable voice signal driver (12) which has a high output impedance in a quiescent operating mode and, in a working operating mode, drives an analog voice signal from the switching center via the subscriber line (38) to the subscriber terminal, with a low output impedance;

a controllable data signal driver, which has a high output impedance in the quiescent operating mode and, in the working operating mode, drives an analog-modulated data signal in a data transmission frequency band (Δf) from the switching center via the subscriber line (38) to the subscriber terminal;

an identification circuit (27), which, in the quiescent operating mode, identifies a current rise in a current flowing via the subscriber line (38) when the subscriber terminal is picked up, and produces a pick-up identification signal;

and having a CODEC circuit (4), which, on receiving the pick-up identification signal from the identification circuit (27) switches the voice signal driver (12) from the quiescent operating mode to the working operating mode and disconnects the identification circuit (27) from the subscriber line, with the identification circuit (27) having a frequency-dependent impedance, which, in the data-transmission frequency band (Δf), corresponds essentially to the output impedance of the voice signal driver in the working operating mode.

8 Claims, 4 Drawing Sheets

DRIVE CIRCUIT

The invention relates to a driver circuit for driving voice and data signals from a switching center via a subscriber line to an end subscriber.

FIG. 1 shows a driver circuit according to the prior art. The driver circuit, which is located in the switching center, receives a voice signal via a signal input E1, which voice signal is emitted from a voice CODEC circuit to a voice signal driver. The voice signal driver can be activated and deactivated by the voice CODEC circuit. The driver circuit also contains a data CODEC circuit for receiving data to be transmitted, via an input E2 of the driver circuit. The data is emitted from the data CODEC circuit to a data driver circuit, which can be activated and deactivated via a control line by the data CODEC circuit.

The signal output from the voice signal driver circuit is followed by a passive low-pass filter, which emits the voice signals, after low-pass filtering, to a signal output A of the driver circuit. The data signal, amplified by the data driver circuit, likewise passes via a line to the signal output A of the driver circuit. The voice and data signal driven by the driver circuit is transmitted to a subscriber via a subscriber line whose line impedance is $Z_L$, where it is split into a voice received signal and a data received signal by means of a splitter comprising a low-pass filter and a high-pass filter. The voice received signal is supplied to an analog telephone terminal for the subscriber while the received data is supplied to a modem. The data transmitted by the driver circuit from the switching center to the subscriber (downstream) is transmitted by means of the controllable data driver, the subscriber line and the high-pass filter to the subscriber's digital data modem. In the opposite direction, the data transmitted from the subscriber's modem is supplied (upstream) via the subscriber line to an external filter, from where it passes to the data CODEC circuit.

The driver circuit, which is located in the switching center, for the subscriber is in a quiescent operating mode (on-hook) when neither the analog telephone terminal nor the subscriber's modem have been picked up. In the quiescent operating mode, both the voice signal driver in the driver circuit [lacuna] have high output impedance. When the analog telephone terminal is activated or picked up by the end subscriber, the series impedance, which is formed by the impedance of the subscriber line $Z_L$ and the impedance of the terminal connected in series, falls, and the direct current flowing from the driver circuit to the subscriber via the subscriber line rises. A pick-up identification circuit which is contained in the driver circuit and is connected via a switch S to the input of the passive low-pass filter in the quiescent operating mode identifies the current rise and emits a detection signal to the voice CODEC circuit. On receiving the pick-up identification signal from the pick-up identification circuit, the voice CODEC circuit changes to a working operating mode and, via a control line St1, activates the voice signal driver whose output impedance is low. Furthermore, on identifying the working operating mode, the voice CODEC circuit isolates the pick-up identification circuit from the passive low-pass filter by actuating the switch S, via the control line St2. The change in operating mode from the quiescent operating mode to the working operating mode results in the output impedance of the voice transmission driver circuit changing from a very high output impedance, which is several kiloohms, to a low output impedance of for example 600 ohms. The passive low-pass filter is provided to prevent this change in the output impedance of the voice signal driver from affecting the data transmission, suppressing the impedance change in the data frequency transmission band.

The passive low-pass filter has to have a very good filter characteristic so that its circuitry demands a relatively high level of complexity, and a circuitry implementation of the driver circuit occupies a relatively large surface area.

The object of the present invention is thus to provide a driver circuit for driving voice and data signals, which requires little circuitry complexity and in which the change between different operating modes has no effect on the transmission characteristics of the driver circuit.

According to the invention, this object is achieved by a driver circuit having the features specified in patent claim 1.

The invention provides a driver circuit for driving voice and data signals from a switching center via a subscriber line to a subscriber terminal having a controllable voice signal driver, which has a high output impedance in the quiescent operating mode (on-hook), and which, in a working operating mode (off-hook), drives an analog voice signal from the switching center via the subscriber line to the subscriber terminal with a low output impedance, having a controllable data signal driver, which has a high output impedance in the quiescent operating mode and, in the working operating mode, drives an analog-modulated data signal in a data transmission frequency band from the switching center via the subscriber line to the subscriber terminal, an identification circuit, which, in the quiescent operating mode, identifies a current rise in a current flowing via the subscriber line when the subscriber terminal is picked up, and produces a pick-up identification signal, having a CODEC circuit, which, on receiving the pick-up identification signal from the identification circuit switches the voice signal driver from the quiescent operating mode to the working operating mode and disconnects the identification circuit from the subscriber line, with the identification circuit having a frequency-dependent impedance, which, in the data-transmission frequency band, corresponds essentially to the output impedance of the voice signal driver in the working operating mode.

The data transmission frequency band is preferably between 26 kHz and 1.1 MHz.

The identification circuit which the driver circuit according to the invention contains preferably has a balanced circuit.

This balanced circuit preferably comprises two transistors, whose control connections are connected to one another.

The transistors are preferably bipolar transistors.

The bipolar transistors are preferably npn transistors.

The npn bipolar transistors preferably each have an emitter connection which is connected to a supply voltage via an associated resistor.

The identification circuit in the driver circuit according to the invention preferably also has a controllable MOSFET transistor which connects a complex impedance to the balanced circuit as a function of a control signal.

The following text describes preferred embodiments of the driver circuit according to the invention, with reference to the attached figures in order to explain features that are essential to the invention.

Figure 1:
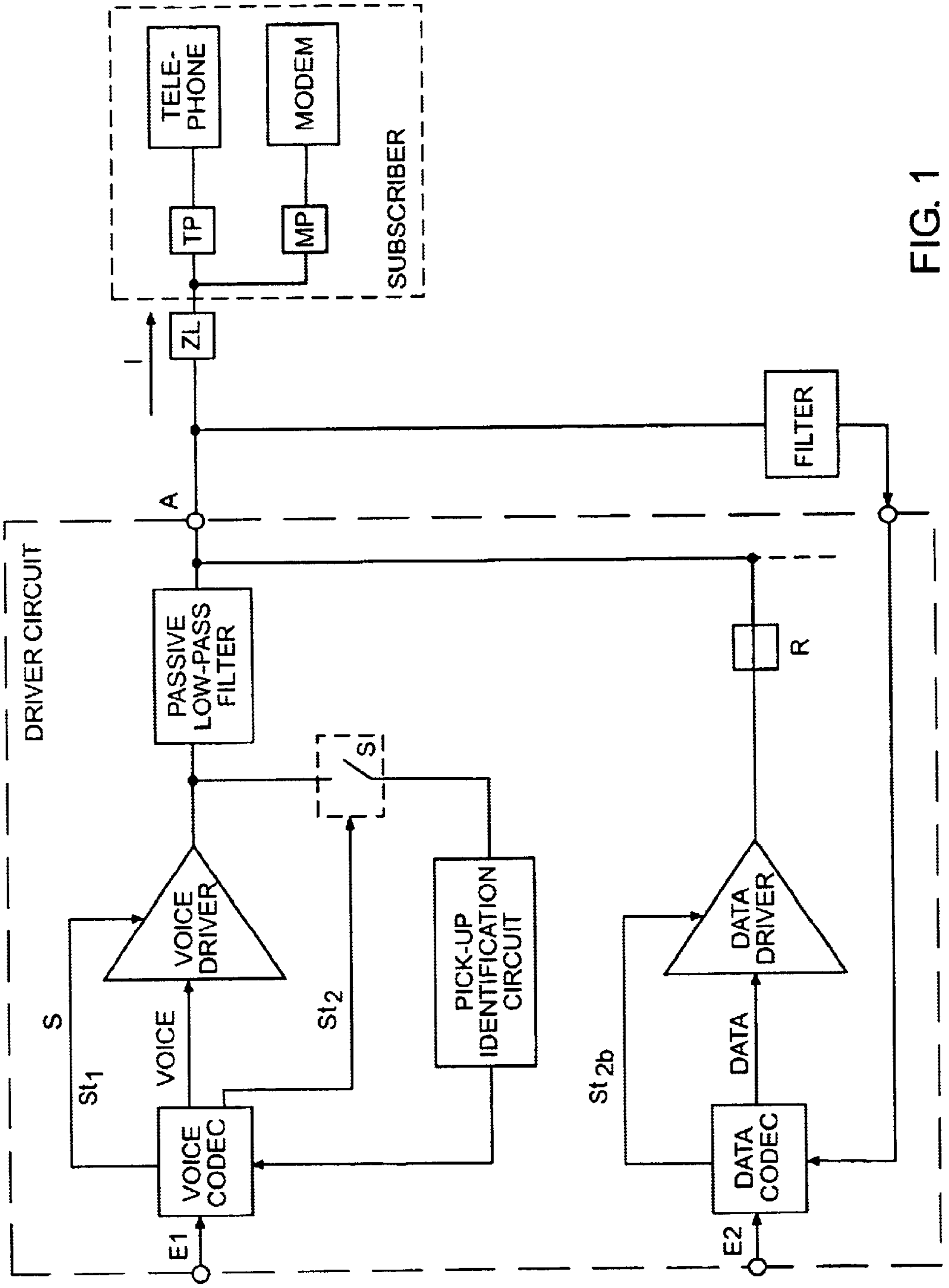
FIG. 1 PRIOR ART
FIG. 1 shows a driver circuit for driving voice and data signals according to the prior art.
Figure 2:
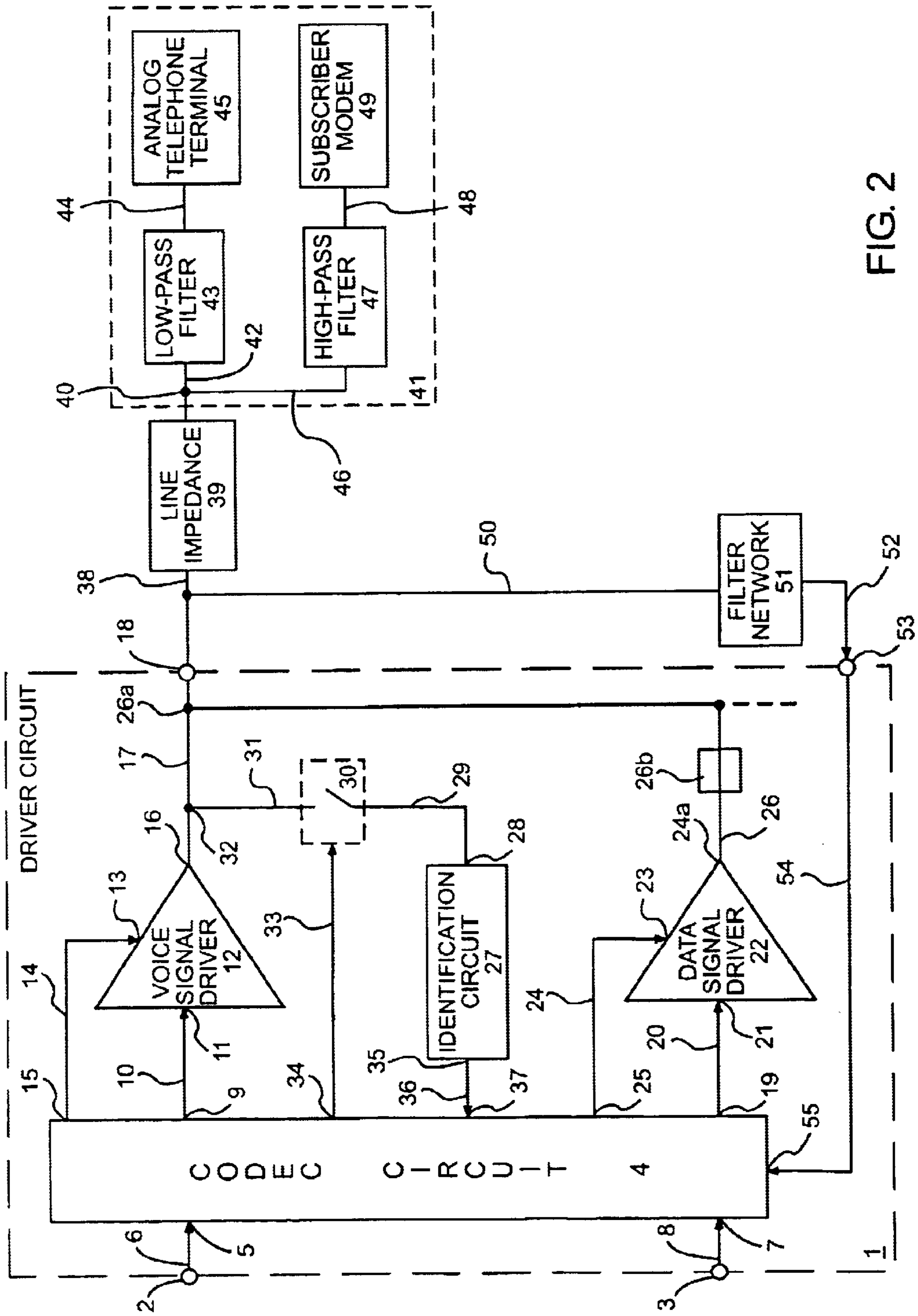
FIG. 2 shows a driver circuit according to the invention for driving voice and data signals.

As can be seen from FIG. 2, the driver circuit 1 according to the invention for driving voice and data signals has a signal input 2 for receiving a digital voice signal emitted from a DSP processor. The driver circuit 1 furthermore has a further signal input 3 for receiving a datastream which originates from a DSP processor and is to be transmitted to a subscriber modem.

The driver circuit has a CODEC circuit 4 which is used jointly by the received and data signals and is connected via a signal input 5 and a voice signal line 6 to the voice signal input 2 of the driver circuit 1, and via a second signal input 7 and a data signal line 8 to the data signal connection 3 of the driver circuit 1.

The CODEC circuit 4 furthermore has a voice signal output 9 which is connected via a line 10 to an input 11 of a voice signal driver 12. The voice signal driver 12 has a control input 13, which is connected via a control line 14 to a control output 15 of the CODEC circuit 4. The CODEC circuit 4 activates and deactivates the voice signal driver circuit 12 via the control line 14. The voice signal driver 12 has a signal output 16, which is connected via line 17 directly to a connection 18 of the driver circuit 1.

In addition to the voice signal output 9, the CODEC circuit 4 has a data signal output 19, which is connected via a line 20 to a signal input 21 of the controllable data signal driver 22. The data signal driver 22 has a control input 23, which is connected via a control line 24 to a control output 25 of the CODEC circuit 4. The CODEC circuit 4 activates and deactivates the data signal driver 22 via the control line 24. The data signal driver 22 has an output 24*a*, which is connected via a line 26 at a node 26*a* to the line 17, and is thus connected to the connection 18 of the driver circuit 1.

The driver circuit 1 furthermore contains an identification circuit 27 for identifying when the subscriber picks up the telephone terminal. One signal input 28 of the identification circuit 27 is connected via a line 29 to a controllable switch 30. The controllable switch 30 is connected via a line 31 at a node 32 to the line 17, and hence to the connection 18 of the driver circuit 1. The controllable switch 30 is connected via a control line 33 to a control output 34 of the CODEC circuit 4. The identification circuit 27 has a signal output 35, which is connected via a line 36 to a signal input 37 of the CODEC circuit 4. The CODEC circuit receives a pick-up identification signal from the identification circuit 27 via the line 36.

The connection 8 of the driver circuit 1 is connected via a subscriber line 38, which has a line impedance 39, to a branch node 40 of a subscriber connection 41. The branch node 40 is connected via a line 42 to a low-pass filter 43, which low-pass-filters the received signals, and emits the low-pass-filtered signals via a line 44 to an analog telephone terminal 45. The branch node 40 is furthermore connected via a line 46 to a high-pass filter 47, which high-pass-filters the received signals and emits them via a line 48 to a subscriber modem 49. The data emitted from the subscriber modem 49 passes via the high-pass filter 47, the subscriber line 38, and via a line 50 to an external filter network 51, and from there via a line 52 to a data input 53 of the driver circuit 1. The data input 53 is connected via a line 54 to a data input 55 of the CODEC circuit 4 for receiving the transmitted data.

When the analog telephone terminal 45 is activated or picked up by the subscriber, the load impedance of the driver circuit 1, which comprises the line impedance 39 and the impedance of the subscriber connection 41, falls. The current flowing via the subscriber line 38 thus rises once the terminal has been picked up.

In the quiescent operating mode, the controllable switch 30 is kept closed by the CODEC circuit 4, so that the identification circuit 27 is connected to the subscriber line in the quiescent operating mode. Once the subscriber terminal has been picked up by the subscriber, the identification circuit 27 identifies a rise in the current, and emits a pick-up identification signal via the line 36 to the CODEC circuit 4. The CODEC circuit 4 changes from the quiescent operating mode to the working operating mode, and activates the voice signal driver 12, via the control line 14. At the same time, it disconnects the identification circuit 27 from the subscriber line by opening the controllable switch 30. The voice signal driver circuit 12, which is now in the working operating mode, has a low output impedance, and drives the voice signals applied to the signal input 11 to the subscriber 41 via the subscriber line 38.

The controllable data signal driver 22 is changed by the CODEC circuit 4 from the quiescent operating mode to the working operating mode, and, in the working operating mode, drives a data signal, applied to the signal input 21, in a fixed data transmission frequency band from the switching center via the subscriber line 38 to the subscriber terminal, when the subscriber modem 49 emits an appropriate request signal via the subscriber line 38 and the filter 51 to the CODEC circuit 4, or activation takes place by means of the data DSP.

The output impedance of the circuit part which comprises the voice signal driver 12 and the identification circuit 27 is not changed significantly when the driver circuit 1 according to the invention changes from the quiescent operating mode to the working operating mode. In the quiescent operating mode, the output impedance of the voice signal driver 12 is very high, so that the output impedance of the circuit part formed by the voice signal driver 12 and the identification circuit 27 is governed essentially by the impedance of the identification circuit 27. The circuitry of the identification circuit 27 in the driver circuit 1 according to the invention is designed such that its impedance is frequency-dependent and, in the data transmission frequency band, the data signal driver circuit 22 has an impedance which essentially corresponds to the output impedance of the voice signal driver 12 in the working operating mode. When the CODEC circuit 4 makes the change from the quiescent operating mode to the working operating mode, the identification circuit 27 is disconnected from the line 17 by the opening of the switch 30, so that, from the point of view of the line connection 18 of the driver circuit 1, the output impedance of the circuit part which is formed by the voice signal driver 12 and the identification circuit 27 does not change. In both operating modes, the impedance in the data transmission frequency band is the output impedance of the voice signal driver 12. It is thus possible for there to be no need to provide a passive low-pass filter for separation of the signal paths between the node 32 of the driver circuit and the node 26 of the driver circuit 1. The transmission characteristic of the driver circuit 1 is changed slightly by the process of changing from the quiescent operating mode to the working operating mode in the driver circuit 1 according to the invention. According to the invention, this is achieved by the frequency-dependent impedance of the identification circuit 27.

Figure 3:
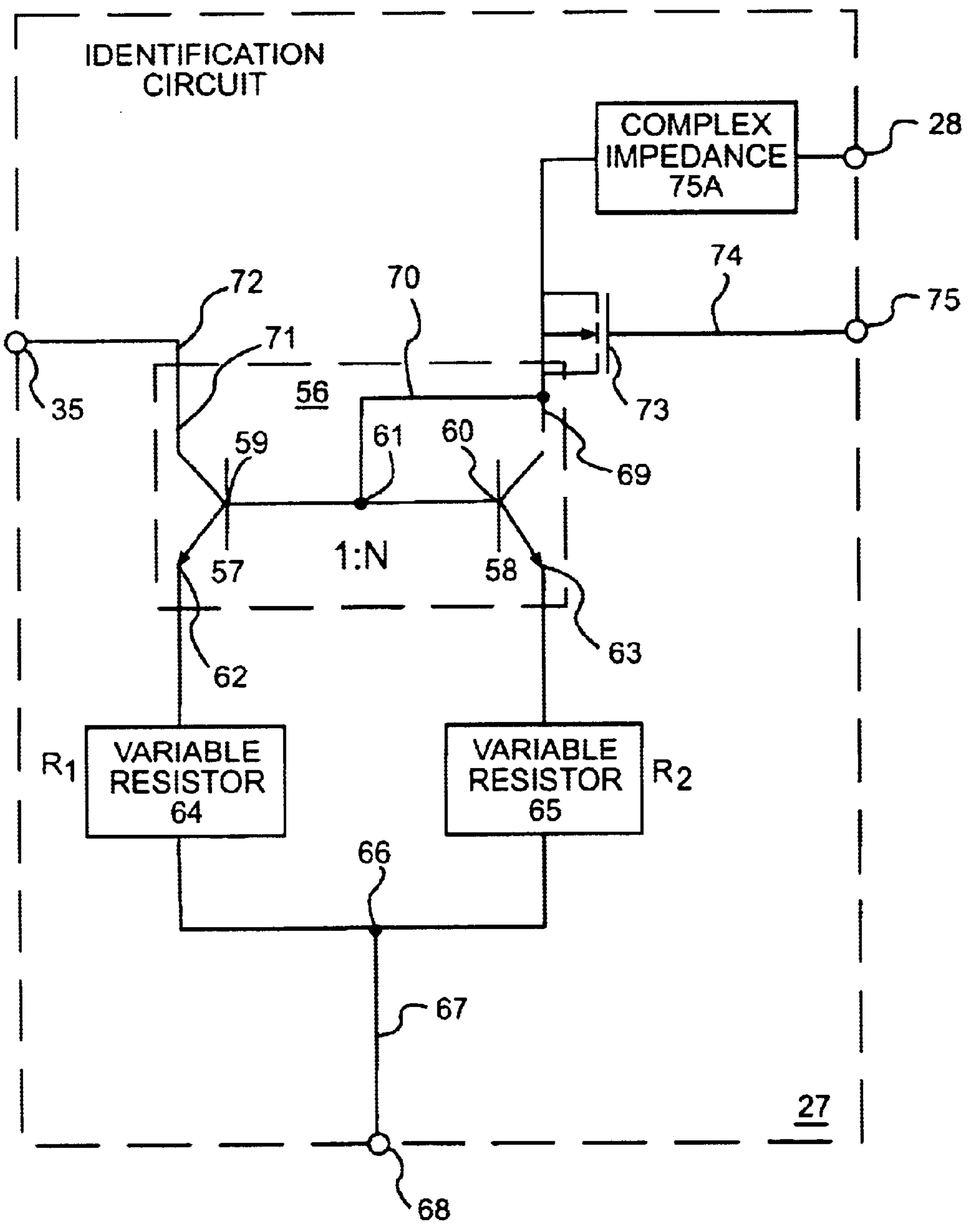
FIG. 3 shows a circuit diagram of the pick-up identification circuit contained in the driver circuit according to the invention.

FIG. 3 shows a circuitry implementation of a particularly preferred embodiment of the identification circuit 27.

The identification circuit 27 contains a balanced circuit 56 with a first bipolar transistor 57 and a second bipolar transistor 58, whose base connections 59, 60 are connected to one another via a line 61. The two emitter connections 62, 63 of the two npn bipolar transistors 57, 58 are connected to a node 66 via variable resistors 64, 65, and the node 66 is connected via a line 67 to a battery supply connection 68 of the identification circuit 27. The collector connection 69 of the bipolar transistor 58 is connected via a line 70 to the connecting line 61. The collector connection 71 of the bipolar transistor 57 is connected via a line 72 to the connection 35. The identification circuit 27 furthermore has a MOSFET transistor 73, which is connected via a control line 74 to a control input 75, and is switched on or off on the basis of a control signal applied to the control input 75. The MOSFET transistor 73 is furthermore connected via a complex impedance 75*a* to the connection 28 of the identification circuit 27.

Figure 4:
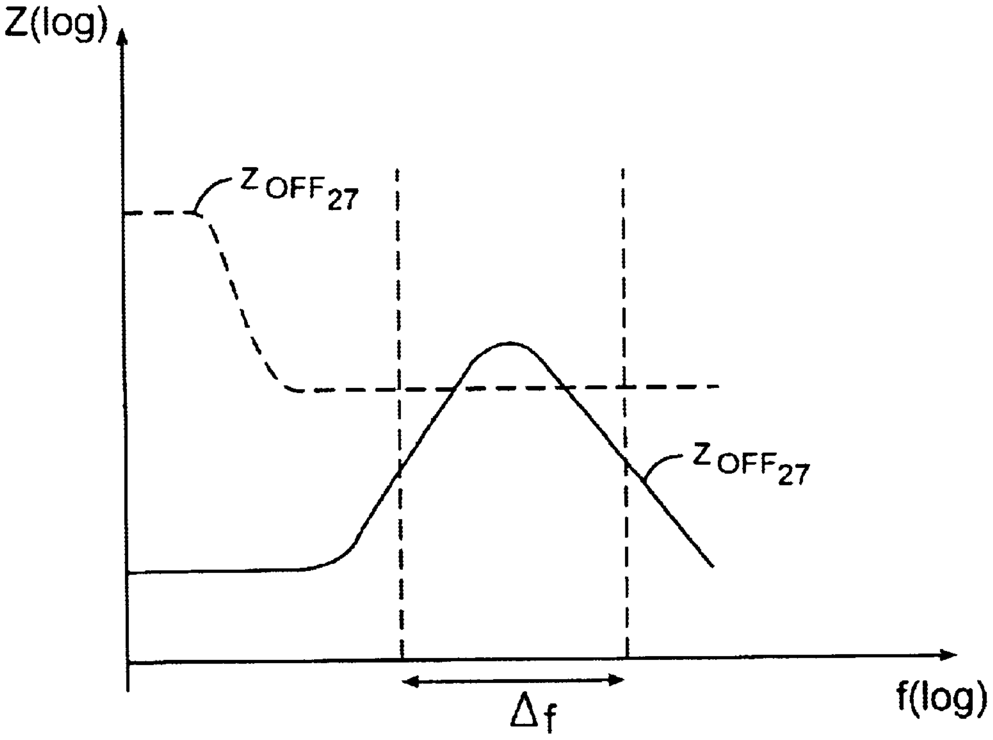
FIG. 4 shows the output impedance profile of the voice signal driver and of the pick-up identification circuit contained in the driver circuit according to the invention.

FIG. 4 shows a diagram to illustrate the output impedance of the identification circuit 27 and the synthesized output impedance of the voice signal driver 12 of the driver circuit 1 according to the invention.

As the frequency rises, the impedance of the identification circuit 27 initially falls and remains at a relatively constant impedance level in the data transmission frequency band Δf. The profile of the synthesized output impedance of the voice signal driver circuit 12 is likewise represented by a solid line.

As can be seen from FIG. 4, the impedance of the pick-up identification circuit 27 essentially has the same magnitude as the output impedance of the voice signal driver 12 in the data transmission band Δf. When a change is made from the quiescent operating mode to the working operating mode, the output impedance of the circuit part which is formed by the voice signal driver 12 and the identification circuit 27 thus does not change significantly at the node 32 of the driver circuit 1. There is thus a minimal change in the output impedance when operating mode changes take place.

What is claimed is:

1. A driver circuit for driving voice and data signals from a switching center via a subscriber line (38) to a subscriber terminal, having:

(a) a controllable voice signal driver (12) which has a high output impedance in a quiescent operating mode and, in a working operating mode, drives an analog voice signal from the switching center via the subscriber line (38) to the subscriber terminal, with a low output impedance;

(b) a controllable data signal driver, which has a high output impedance in the quiescent operating mode and, in the working operating mode, drives an analog-modulated data signal in a data transmission frequency band (Δf) from the switching center via the subscriber line (38) to the subscriber terminal;

(c) an identification circuit (27), which, in the quiescent operating mode, identifies a current rise in a current flowing via the subscriber line (38) when the subscriber terminal is picked up, and produces a pick-up identification signal;

(d) and having a CODEC circuit (4), which, on receiving the pick-up identification signal from the identification circuit (27) switches the voice signal driver (12) from the quiescent operating mode to the working operating mode and disconnects the identification circuit (27) from the subscriber line, with the identification circuit (27) having a frequency-dependent impedance, which, in the data-transmission frequency band (Δf), corresponds essentially to the output impedance of the voice signal driver in the working operating mode.

2. The driver circuit as claimed in claim 1, characterized in that the data transmission frequency band (Δf) is between approximately 26 kHz and 1.1 MHz.

3. The driver circuit as claimed in claim 1 or 2, characterized in that the identification circuit (27) has a balanced circuit (56).

4. The driver circuit as claimed in one of the preceding claims, characterized in that the balanced circuit (56) comprises two transistors (57, 58), whose control connections are connected to one another.

5. The driver circuit as claimed in one of the preceding claims, characterized in that the transistors in the balanced circuit (56) are bipolar transistors.

6. The driver circuit as claimed in claim 5, characterized in that the bipolar transistors are npn transistors.

7. The driver circuit as claimed in claim 6, characterized in that the bipolar transistors each have an emitter connection which is connected to the supply voltage via an associated resistor.

8. The driver circuit as claimed in one of the preceding claims, characterized in that the identification circuit has a controllable MOSFET, which connects a complex impedance (75*a*) to the balanced circuit (56) as a function of a control signal.

* * * * *